Figure 1:
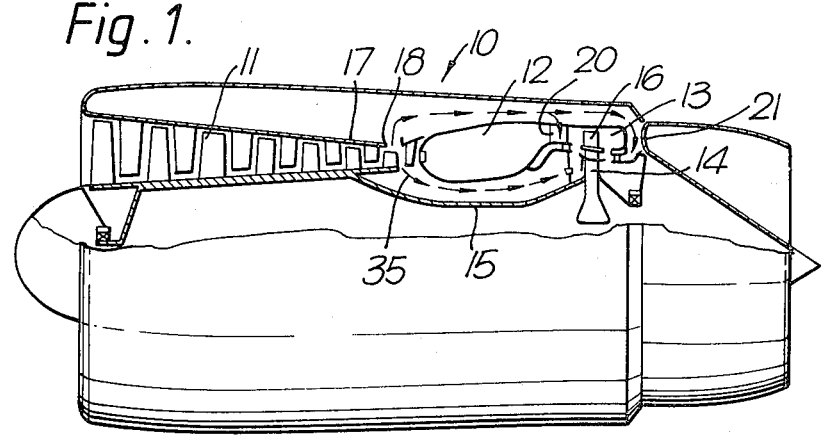

United States Patent [19]

Tubbs

[11] 4,302,148
[45] Nov. 24, 1981

[54] GAS TURBINE ENGINE HAVING A COOLED TURBINE

[75] Inventor: Henry Tubbs, Shirley near Brailsford, England

[73] Assignee: Rolls-Royce Limited, London, England

[21] Appl. No.: 116,655

[22] Filed: Jan. 29, 1980

[30] Foreign Application Priority Data

Jan. 2, 1979 [GB] United Kingdom ............... 03637/79

[51] Int. Cl.³ ................................................ F01D 5/18
[52] U.S. Cl. .................................... 415/115; 415/117
[58] Field of Search ............... 60/39.75; 415/115, 116, 415/117

[56] References Cited

U.S. PATENT DOCUMENTS

| | | | |
|---|---|---|---|
| 2,639,579 | 5/1953 | Willgoos | 415/115 |
| 2,672,013 | 3/1954 | Lundquist | 60/39.75 |
| 2,891,382 | 6/1959 | Brofitt | 60/39.75 |
| 3,034,298 | 5/1962 | White | 415/116 |
| 3,535,873 | 10/1970 | Szydlowski | 415/115 |
| 3,751,909 | 8/1973 | Kohler | 415/115 |
| 3,791,758 | 2/1974 | Jenkinson | 415/116 |
| 3,873,234 | 3/1975 | Penny | 415/115 |

Primary Examiner—Robert E. Garrett
Attorney, Agent, or Firm—Cushman, Darby & Cushman

[57] ABSTRACT

A gas turbine engine is disclosed in which a particularly efficient use of cooling air is made. In this engine, at least part of the cooling of the turbine blades is effected by a bleed of air from one of the compressors. This bleed air is ducted to flow between the shanks of adjacent rotor blades to cool them, and the used bleed air then rejoins the main gas flow of the engine upstream of the turbine rotor.

14 Claims, 4 Drawing Figures

COOLING AIR FLOW

GAS TURBINE ENGINE HAVING A COOLED TURBINE

This invention relates to a gas turbine engine having a cooled turbine.

It is very common amongst present day gas turbines to provide some form of cooling for the hot areas of the engine and in particular of the turbine. This cooling has mainly involved the use of air bled from one of the compressors of the engine which is then fed to passages inside the rotor and stator blades which require to be cooled. The air is then allowed to rejoin the main gas flow of the engine. It has long been realised that because this cooling air does not follow the same thermodynamic cycle as the main air flow through the engine this cooling air flow represents a loss of engine power and efficiency. As the gas temperature and degree of cooling required has increased so has the amount of loss incurred by this form of cooling.

The present invention provides a gas turbine engine in which at least a proportion of the turbine cooling is carried out in a manner which allows the cooling air to become less of a thermodynamic cycle performance debit than in conventional systems.

According to the present invention a gas turbine engine having a cooled turbine comprises apertures in a wall of a compressor of the engine adapted to allow compressor bleed air to flow from the main air flow of the engine, first duct means adapted to cause the bleed air to flow to a turbine rotor of the engine and to penetrate into the spaces between the shanks of adjacent rotor blades to cool them, and second duct means adapted to convey the bleed air from the turbine rotor into the main gas flow of the engine.

In a preferred embodiment, the first duct means causes the bleed air to flow outside the main gas passage of the engine, and inwardly through vanes in the turbine of the engine so as to be directed forwardly of the engine into the spaces between the blade shanks. In this case the second duct means may convey the bleed air forwardly of the engine from the front faces of the shanks and into the combustion chamber or the nozzle guide vanes upstream of the rotor.

The flow of bleed air past the shanks of the rotor blades may be the only method of cooling of the blades or alternatively an additional flow of bleed air may pass through internal passages within the aerofoil of the blade so as to provide additional cooling in a traditional manner.

Figure 2:
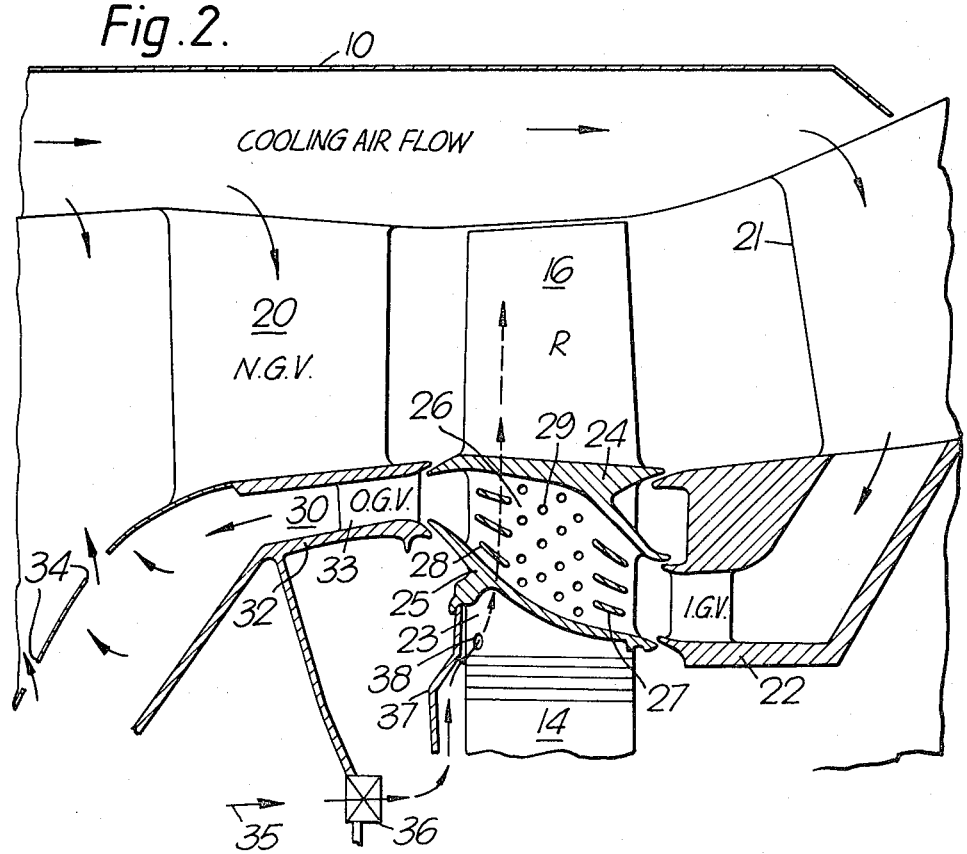
Figure 3:
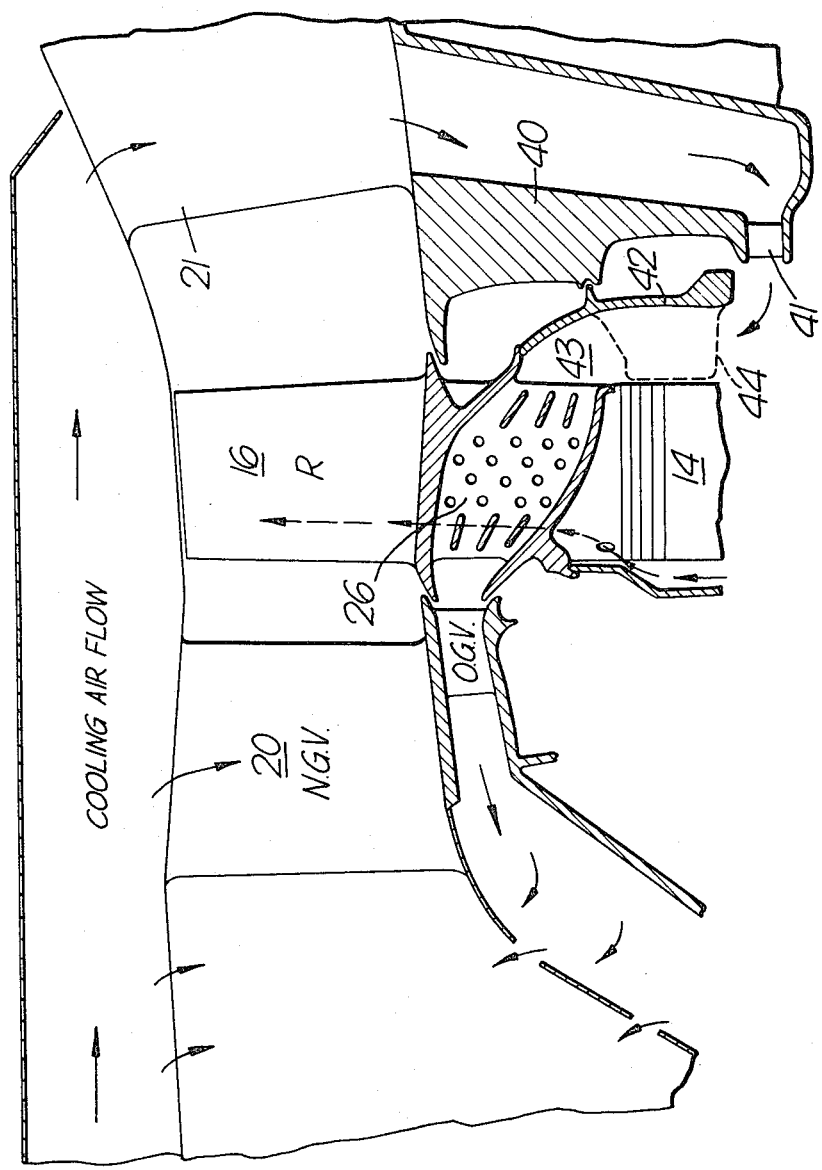
Figure 4:
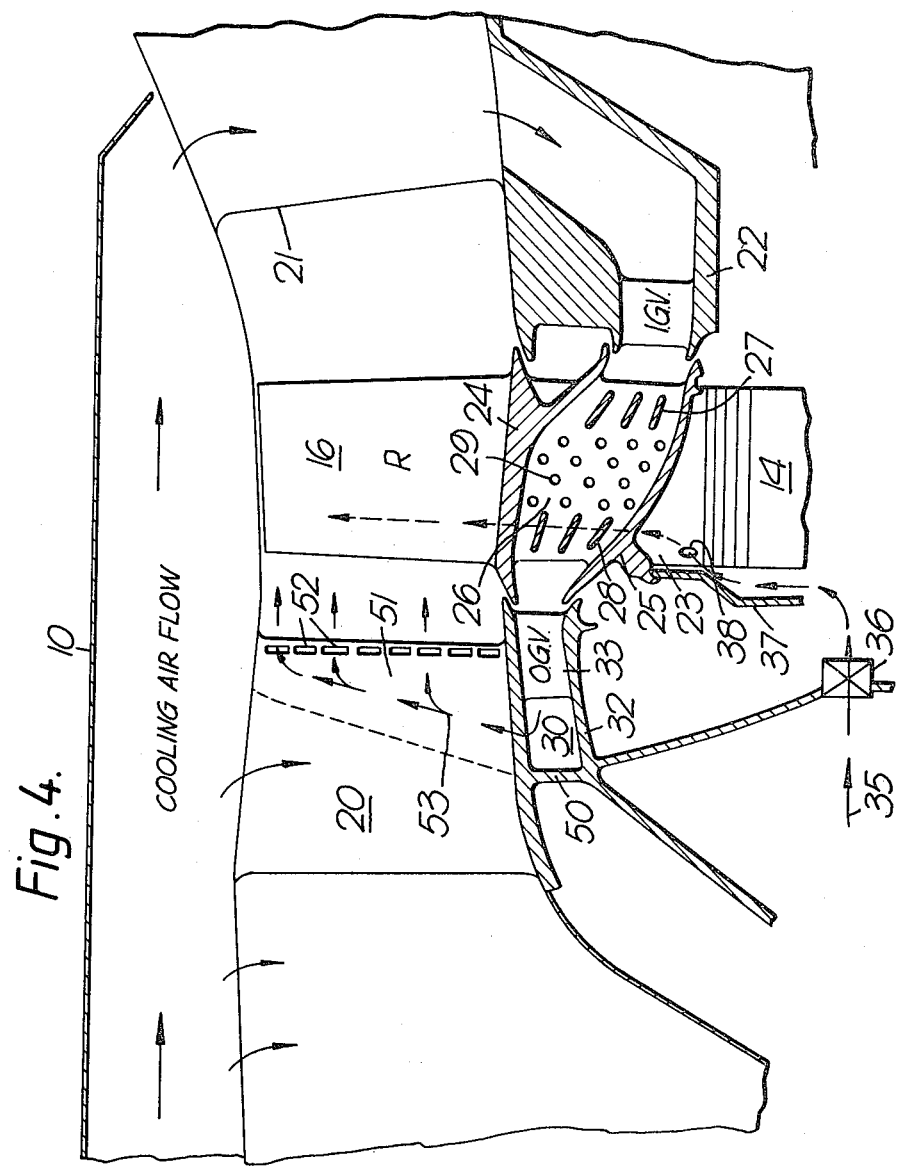

The invention will now be particularly described, merely by way of example, with reference to the accompanying drawings in which:

FIG. 1 is a partly broken away view of a gas turbine engine in accordance with the invention FIG. 2 is an enlarged section through the turbine region of the engine of FIG. 1, and FIG. 3 is a view similar to that of FIG. 2 but of a further embodiment, and FIG. 4 is a view similar to that of FIG. 2 but showing a slightly modified embodiment.

In FIG. 1 there is shown a gas turbine engine comprising a casing 10 within which are mounted a compressor 11, combustion chamber 12 and a turbine 13. The compressor 12 and the rotor 14 of the turbine are drivingly interconnected via shaft 15. The turbine rotor 14 carries a stage of rotor blades 16.

Operation of the engine overall is conventional in that the compressor 11 takes in air and compresses it. In the combustion chamber 12 the compressed air is mixed with fuel and burnt and the resulting hot gases are expanded through the turbine 13. In passing through the turbine the gases act on the rotor blades 16 and thus drive the compressor 11 through the shaft 15.

In order to cool the turbine 16 the outer casing 17 of the compressor 11 is provided with a plurality of bleed apertures 18 which allow a proportion of the air compressed by the compressor to flow into the space between the casings 10 and 17. This air is then caused to flow downstream of the engine, through the space between the casing 10 and combustion chamber 12 and thus into the space between the outer casing 19 of the turbine 13 and the casing 10. Cooling processes may be carried out in this duct so as to increase the effectiveness of this cooing air. Part of the air then flows inwardly through the hollow nozzle guide vanes 20 for conventional cooling and part through a second series of hollow stator vanes 21.

The air flowing inwardly through the vanes 21 is directed forwardly through nozzle structure 22 and flows onto the shanks 23 of the rotor blade 16. It will be seen from FIG. 2 that each of these shanks is provided with its own cooling air passage defining walls. The outer of these walls 24 comprises the normal blade platforms which also forms the inner boundary of the flow annulus through the turbine blades 16. The inner wall 25 is arranged to project similarly from the blade shank 23 so that inbetween the projections 24 and 25 a divergent-convergent cooling passage 26 is formed.

Clearly when the cooling air passes through the passage 26 it will be extracting some heat from the shank 23 and since the shank is mainly heated by heat flow from the aerofoils of the blade 16 this will have the effect of cooling the blades. In order to enhance this cooling the blade shanks which form the side walls of the passages 26 are provided with projections which increase the surface area and provide some turbulence in the flow. In the illustrated embodiment these projections comprise two sets of fins 27 and 28 and a series of columnar projections or pedestals 29.

Although a considerable amount of heat will in any case be conducted through the metal of the blade itsef and into the blade shank it may be necessary to provide means of enhancing the conduction of heat. A number of methods will occur to those skilled in the art for instance as the use of a dense liquid such as sodium or the use of a heat pipe arrangement.

The bleed air having passed the passage 26 blows out forwarldy through the nozzles formed inbetween the forward extremities of the projections 24 and 25. These nozzles are arranged to line-up with the entry to a further passage 30 which is formed inside the inner platforms 31 of the nozzle guide vanes 20 and whose inner boundary is defined by a wall member 32. Outlet guide vanes 33 extending between the platform 31 and wall 32 are used to correct the whirl of the flow of bleed air and recover dynamic pressure.

The passage 30 extends forwardly of the engine and causes the bleed air to reach apertures 34 in the wall of the combustion chamber 12. The bleed air rejoins the main gas flow of the engine through these apertures and then carries on to flow through the turbine in the normal manner.

As described so far the blades 16 are fully cooled by heat extracted from the shank 23 of the blade. Although this may be sufficient in some circumstances it may be desirable to provide additional cooling and the embodiment illustrates how this can be done. In this case a flow of air is allowed to take place between the downstream extremity of the compressor 11 and the upstream extremity of the combustion chamber 12. This flow is illustrated by arrows 35 and it will be seen that the air flows inwardly to the space inside the chamber 12 and rearwardly of the engine to the front face of the turbine rotor 14. It is then swirled through nozzles 36 toward the space formed between a cover plate 37 and the front face of the disc 14 and the blade shanks 23. Apertures 38 provided in the lower portions of the blade shanks allow the air to enter a system of cooling passages within the blade 16. The swirling of the air is in the direction of motion of the rotor.

The cooling air traverses these passages in the normal manner and is then allowed to rejoin the main gas flow of the engine in the region of the blades.

It will be seen that because the cooling air flow which flows past the shanks does not bypass any part of the turbine, it subsequently follows the same thermodynamic cycle as does the main gas flow of the engine. It does not therefore represent a thermodynamic degradation of the efficiency of the engine and provided that its passage through the various ducts is arranged to be efficient, a reduction in the losses involved may be made. In fact in theory it would be possible to increase the magnitude of this cooling flow to a substantial proportion of the cooled engine airflow without seriously affecting the thermodynamic efficiency of the engine.

FIG. 3 illustrates a possible modification to the embodiment described with reference to FIG. 2. In this case the cooling air follows exactly the same path as in the previous embodiment up to its passage inwardly through the vanes 21. In the modified arrangement of FIG. 3 the air then flows inside an extended nozzle structure 40 which carries the air radially inwardly for a greater distance than the structure 22. The air then discharges toward the disc 14 through nozzles 41.

Because the nozzles 41 are positioned radially inward of the blade shanks 23 and their cooling passages, there is room to use a cover plate 42 attached to the disc 14 but spaced from its surface so as to leave a passage 43 therebetween. The cooling air is directed into this passage from the nozzles 42 and it flows through the passage and into the inter-blade shank passages 26.

Because of the rotation of the disc 14 and plate 42 the air flowing in the passage 43 is subject to centrifugal pumping and hence its pressure may be increased before it flows through the passage 26. Although the cover plate and disc will effect pumping it may be necessary to provide radial vanes such as those shown in broken lines at 44 in the passage 43. This will enhance the pumping effect.

FIG. 4 illustrates a further modification of the FIG. 2 embodiment of the invention in which the passage 30, instead of allowing the bleed air to reach apertures 34, is blanked off by a wall 50. The nozzle guide vanes 20 are modified to include hollow rear portions 51 which communicated with the passage 30 and which also have exit apertures 52 in their trailing edge region. In this manner the bleed air is caused to flow, as indicated by the arrows 53, into the vanes and out through the apertures 52 to rejoin the main gas flow of the engine just downstream of the rotor.

This arrangement has the advantage that the bleed air re-enters the main gas flow of the engine at a point of lower pressure, thus reducing the pressure required in this bleed air flow.

It will be appreciated that there are a number of modifications which could be made to the arrangement described above. Thus in particular the ducting used to convey the bleed air to the turbine could lie inside the main gas flow annulus rather than outside as it is described above. It would also be possible to flow the bleed air into the spaces between the shanks and out again from the same side rather than using a through flow as described above. It will also be possible to use various other cooling methods in conjunction with the method of the invention.

I claim:

1. A gas turbine engine having a cooled turbine, a compressor wall having apertures therein for the flow of compressor bleed air from the main engine airflow, first duct means for directing the bleed air to flow to said turbine, the turbine comprising a rotor disc carrying a row of rotor blades each having a root portion, a shank portion and an aerofoil portion, said first duct means directing said bleed air between the shanks of adjacent blades to cool them, and second duct means for conveying the bleed air from the tubine rotor into the main gas flow of the engine upstream of the turbine rotor.

2. A gas turbine engine as claimed in claim 1 and in which said first duct means includes first ducting for carrying the bleed air outside the main gas flow passage of the engine, hollow vanes for carrying the bleed air inwardly to the region inside the main gas flow passage of the engine, and nozzles for directing the bleed air from the hollow vanes forwardly into the spaces between the blade shanks.

3. A gas turbine engine as claimed in claim 2 and comprising a combustion chamber and nozzle guide vanes, said second duct means comprising second ducting for conveying the bleed air forwardly of the engine from the blade shanks and into the combustion chamber or the nozzle guide vanes upstream of the rotor.

4. A gas turbine engine as claimed in claim 3 and in which said nozzle guide vanes have inner and outer platforms, said second ducting being carried from said inner platforms.

5. A gas turbine engine as claimed in claim 2 and in which said rotor carries an annular cover plate spaced from its surface and extending inwardly from said spaces between the blade shanks to define a passage within which said bleed air can flow radially outwardly, said nozzles being disposed to direct said bleed air into the radially inner part of said passage.

6. A gas turbine engine as claimed in claim 5 and in which said cover plate carries an array of radial vanes which in operation provide centrifugal pumping of the bleed air flowing radially outwardly in said passage.

7. A gas turbine engine as claimed in claim 2 and in which said nozzles are radially aligned with said spaces between the blade shanks.

8. A gas turbine engine as claimed in claim 1 and in which walls extend from each said blade shank, said walls defining in cooperation with the shank of the next adjacent blade a convergent-divergent cooling passage which comprises the space between the blade shanks.

9. A gas turbine engine as claimed in claim 1 and in which said engine has hollow nozzle guide vanes into which said second duct means convey the bleed air, the nozzle guide vanes having exit apertures through which the bleed air may blow to rejoin the main gas stream of the engine.

10. A gas turbine engine as claimed in claim 1 and comprising projections on the surfaces of said blade shanks which increase the surface area available for heat transfer from the shanks.

11. A gas turbine engine as claimed in claim 1 and in which there is a secondary feed system of cooling air and internal passages within said rotor blades through which cooling air from said secondary feed system may flow to cool the blades.

12. A gas turbine engine as claimed in claim 11 and in which said engine has a compressor, said secondary feed system taking bleed air from said compressor and ducting it inside the main gas flow annulus of the engine to said turbine.

13. A gas turbine engine as claimed in claim 12 and comprising swirling means adapted to swirl said secondary flow of cooling air in the same direction as that of the movement of the rotor, prior to said air entering said rotor blades.

14. A gas turbine engine as claimed in claim 13 and in which said swirling means comprises an annular array of swirl nozzles.

* * * * *